United States Patent
Sakamaki

(10) Patent No.: US 8,002,005 B2
(45) Date of Patent: Aug. 23, 2011

(54) PNEUMATIC TIRE WITH TREAD INCLUDING THREE DIMENSIONAL SIPES HAVING AT LEAST TWO TIE BARS

(75) Inventor: Yuji Sakamaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1054 days.

(21) Appl. No.: 11/795,235

(22) PCT Filed: Jan. 13, 2006

(86) PCT No.: PCT/JP2006/000391
§ 371 (c)(1),
(2), (4) Date: Jul. 13, 2007

(87) PCT Pub. No.: WO2006/075713
PCT Pub. Date: Jul. 20, 2006

(65) Prior Publication Data
US 2008/0135149 A1    Jun. 12, 2008

(30) Foreign Application Priority Data

Jan. 14, 2005   (JP) ................................ 2005-008330

(51) Int. Cl.
*B60C 11/12*  (2006.01)
(52) U.S. Cl. ........ 152/209.22; 152/209.23; 152/DIG. 3; 152/902
(58) Field of Classification Search ............. 152/209.18, 152/209.21, 209.22, 209.23, DIG. 3, 902
See application file for complete search history.

(56) References Cited

U.S. PATENT DOCUMENTS

| | | | | |
|---|---|---|---|---|
| 5,783,002 | A  * | 7/1998 | Lagnier ..................... | 152/DIG. 3 |
| 6,050,313 | A  * | 4/2000 | Tsuda ....................... | 152/DIG. 3 |
| 2003/0029537 | A1* | 2/2003 | Iwamura .................. | 152/209.18 |
| 2004/0134579 | A1  | 7/2004 | Tanaka | |
| 2008/0029193 | A1* | 2/2008 | Perrin et al. ............. | 152/209.18 |

FOREIGN PATENT DOCUMENTS

JP          10-181314       *   7/1998
(Continued)

OTHER PUBLICATIONS

Machine translation for Japan 10-309910 (no date).*

(Continued)

*Primary Examiner* — Steven D Maki
(74) *Attorney, Agent, or Firm* — Sughrue Mion, PLLC

(57) ABSTRACT

A pneumatic tire including a plurality of grooves which extend at least in the circumferential direction, and which are formed in a tread portion and sipes which are formed in a plurality of blocks formed by the grooves. In the pneumatic tire, the groove width of the sipe formed in each of the blocks constituting a center region of the tread portion is greater than the groove width of the sipe formed in each of the blocks constituting edge regions of the tread portion. At least the sipes formed in the blocks constituting the center region are three-dimensional sipes each having a zigzag shape extending in the width, circumferential and radial directions of the tire. Each of the three-dimensional sipes is provided with, on the inner side thereof in the tire radial direction, at least one cutout which has a length, in the tire radial direction, of 50 to 90% of the length of the three-dimensional sipe in the tire radial direction, and which has a length, in the tire width direction, of 1 to 5 mm.

1 Claim, 5 Drawing Sheets

FOREIGN PATENT DOCUMENTS

| | | | |
|---|---|---|---|
| JP | 10-309910 | * | 11/1998 |
| JP | 2001-1722 A | | 1/2001 |
| JP | 2002-293111 A | | 10/2002 |
| JP | 2002-321509 A | | 11/2002 |
| JP | 2003-25812 A | | 1/2003 |
| JP | 2004-203128 A | | 7/2004 |

OTHER PUBLICATIONS

Machine translation for Japan 10-181314 (no date).*

* cited by examiner

Fig.4
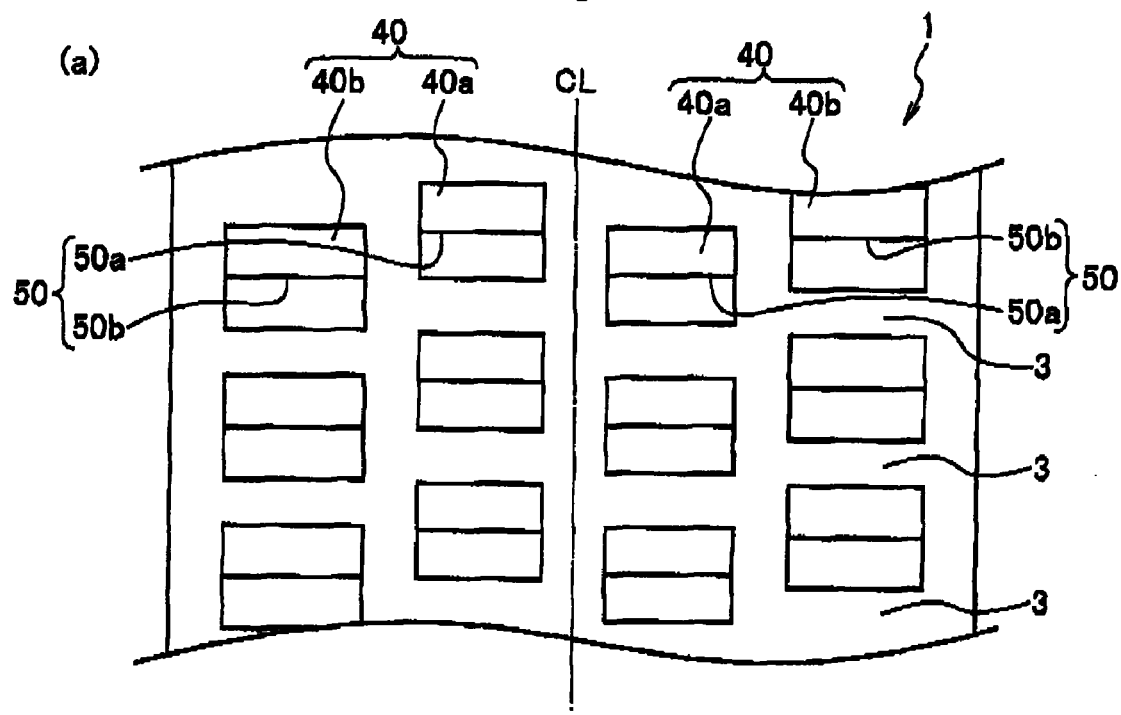
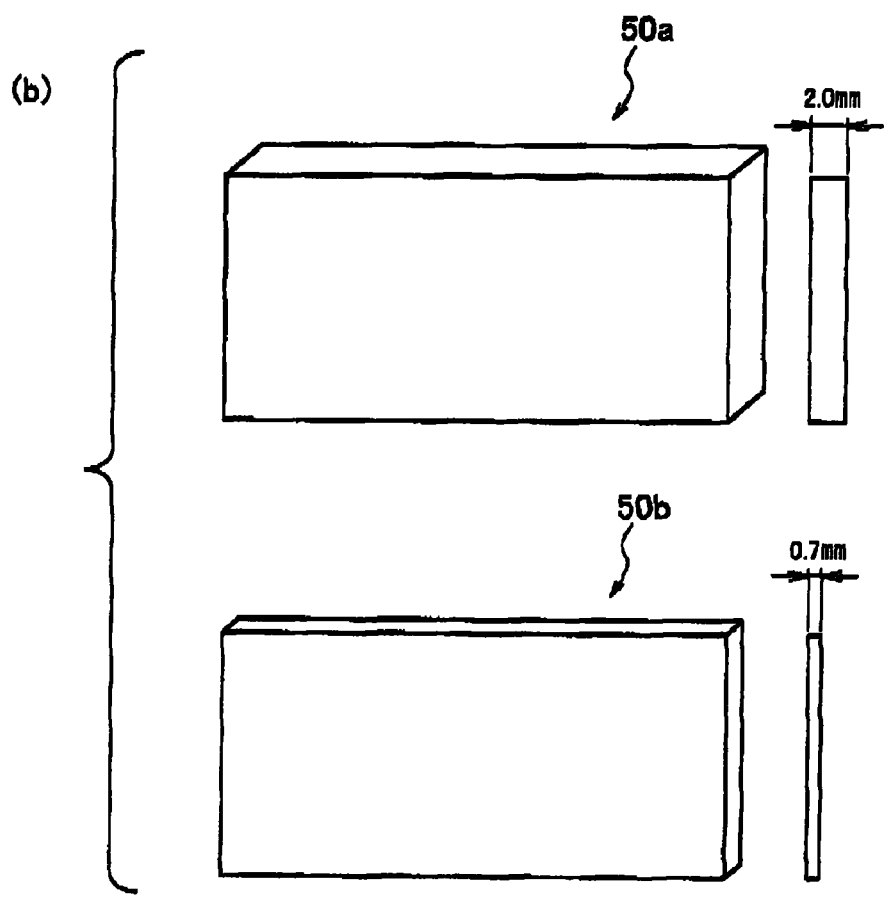

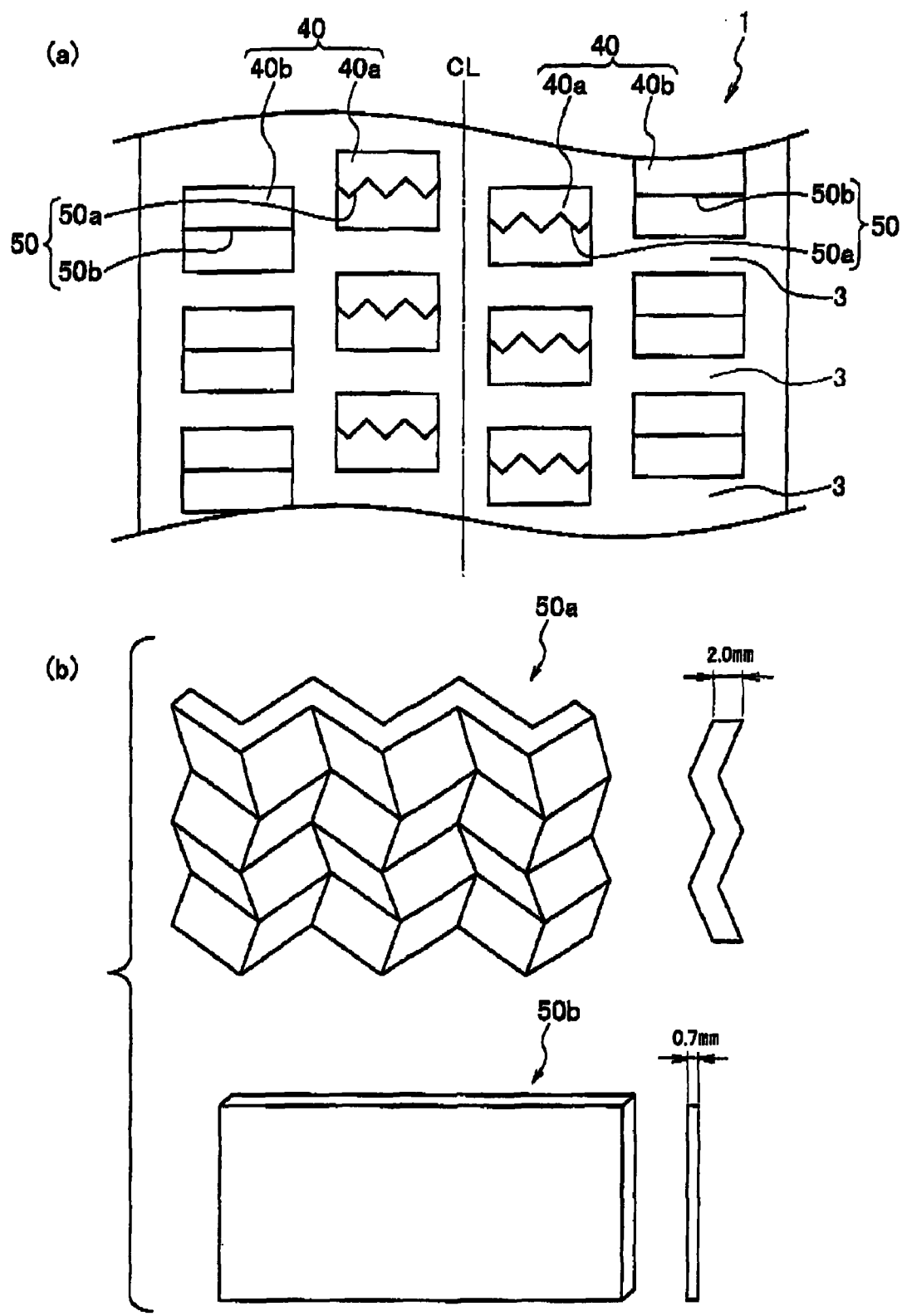

PNEUMATIC TIRE WITH TREAD INCLUDING THREE DIMENSIONAL SIPES HAVING AT LEAST TWO TIE BARS

TECHNICAL FIELD

The present invention relates to a pneumatic tire that includes a plurality of grooves extending at least in the circumferential direction in a tread portion, and that also includes a plurality of blocks formed by the grooves.

BACKGROUND ART

Conventionally, a pneumatic tire including sipes, which are narrow slits, in blocks formed in a tread portion has been known.

In addition, in recent years, there has been a pneumatic tire including three-dimensional sipes each formed into a zigzag shape extending in the tire width direction, in the tire circumferential direction and in the tire radial direction (for example, refer to Japanese Patent Application Laid-open Publication 2004-203128).

In a pneumatic tire including such three-dimensional sipes as described above, the surface of each block is divided along the tire width direction. Accordingly, although the starting and braking performances on snow are improved, the rigidity of the block is made insufficient. This leads to a problem of an insufficient stability in straight running on the dry road surface.

For this reason, it has been tried to reduce the depth (the length in the tire radial direction) of the above-described three-dimensional sipes to improve the rigidity of the block so that the stability in straight running on the dry road surface can increase. However, in this case, as the block wears progressively, the depth of the three-dimensional sipes is further reduced, so that the rigidity of the block is excessively improved. As a result, a problem occurs that the starting and braking performances on snow are deteriorated.

In view of the above-described problems, an object of the present invention is to provide a pneumatic tire that achieves a highly good balance between the stability in straight running on the dry road surface and the starting and braking performances on snow.

DISCLOSURE OF THE INVENTION

For the purpose of solving the above-described problems, an aspect of the present invention is a pneumatic tire including a plurality of grooves extending at least in the circumferential direction in a tread portion of the tire and sipes in a plurality of blocks formed by the grooves. The pneumatic tire has the following characteristics. The groove width of each sipe formed in each of the blocks constituting a center region of the tread portion is greater than the groove width of a sipe formed in each of the blocks constituting edge regions of the tread portion. At least the sipes formed in the blocks constituting the center region are three-dimensional sipes having a zigzag shape extending in the tire width direction, in the tire circumferential direction, and in the tire radial direction. Each of the three-dimensional sipes is provided with, on the inner side thereof in the tire radial direction, at least one cutout which has a length, in the tire radial direction, of 50 to 90% of the length of the three-dimensional sipe in the tire radial direction, and which has a length, in the tire width direction, of 1 to 5 mm.

In the pneumatic tire according to the aspect of the present invention, the groove width of a sipe formed in each of the blocks constituting a center region of the tread portion is greater than the groove width of a sipe formed in each of the blocks constituting an edge region of the tread portion. Accordingly, the sipes each having the greater groove width can function like grooves. Specifically, at the time of running on snow, the sipes, each having the greater groove width, compress the snow to increase the friction between the tread portion and the road surface, like the grooves. As a result, the starting and braking performances can be improved.

On the other hand, since the groove width of the sipes formed in the blocks constituting the center region of the tread portion is greater than the groove width of each of the sipes formed in the blocks constituting the edge regions of the tread portion, the rigidity of the block is decreased. Accordingly, the stability in straight running on the dry road surface is decreased. However, since at least the sipes formed in the blocks constituting the center region are the three-dimensional sipes having a zigzag shape extending in the width, circumferential and radial directions of the tire, adjacent portions of the blocks stick on each other when the block falls down. Accordingly, the rigidity of the block is improved, and thus the stability in straight running on the dry road surface is also improved. Moreover, each of the three-dimensional sipes is provided with, on the inner side thereof in the tire radial direction, at least one cutout which has a length, in the tire radial direction, of 50 to 90% of the length of the three-dimensional sipe in the tire radial direction. Further, the cutout has a length, in the tire width direction, of 1 to 5 mm. Accordingly, the depth of part of the three-dimensional sipe can be reduced, and thus the rigidity of the block can be further improved. As a result, the stability in straight running on the dry road surface increases. Incidentally, when the length of each cutout in the tire radial direction is smaller than 50% of the length of each three-dimensional sipe in the tire radial direction, the depth of part of the three-dimensional sipe is not sufficiently reduced. Accordingly, the rigidity of the block cannot be sufficiently improved. On the other hand, when the length of each cutout in the tire radial direction is greater than 90% of the length of each three-dimensional sipe in the tire radial direction, it is not possible to fulfill the function of the three-dimensional sipe. Accordingly, the starting and braking performances on snow cannot be improved. Furthermore, when the length of the three-dimensional sipes in the tire width direction is less than 1 mm, a sufficient rigidity of the block cannot be obtained. Accordingly, the degree of improvement in the stability in straight running on the dry road surface is small. On the other hand, when the length is greater than 5 mm, the rigidity of the block is excessively high. As a result, the starting and braking performances on snow cannot be improved.

Moreover, it is preferable that, when two or more of the cutouts are formed, a cutout, which is closer to the tire equator line, has a length in the tire radial direction greater than the length in the tire radial direction of another cutout.

When two or more of the cutouts are formed, since the cutout, which is closer to the tire equator line, has a length in the tire radial direction greater than the length in the tire radial direction of another cutout, the rigidity of the block on the tire equator line side can be further improved. As a result, it is possible to suppress the reduction in the stability in straight running on the dry road surface.

BRIEF DESCRIPTION OF THE DRAWINGS

FIG. 4 is a diagram showing a tread portion according to Comparative Example 2 of the present invention.

FIG. 5 is a diagram showing a tread portion according to Comparative Example 3 of the present invention.

BEST MODE FOR CARRYING OUT THE INVENTION

Figure 1:
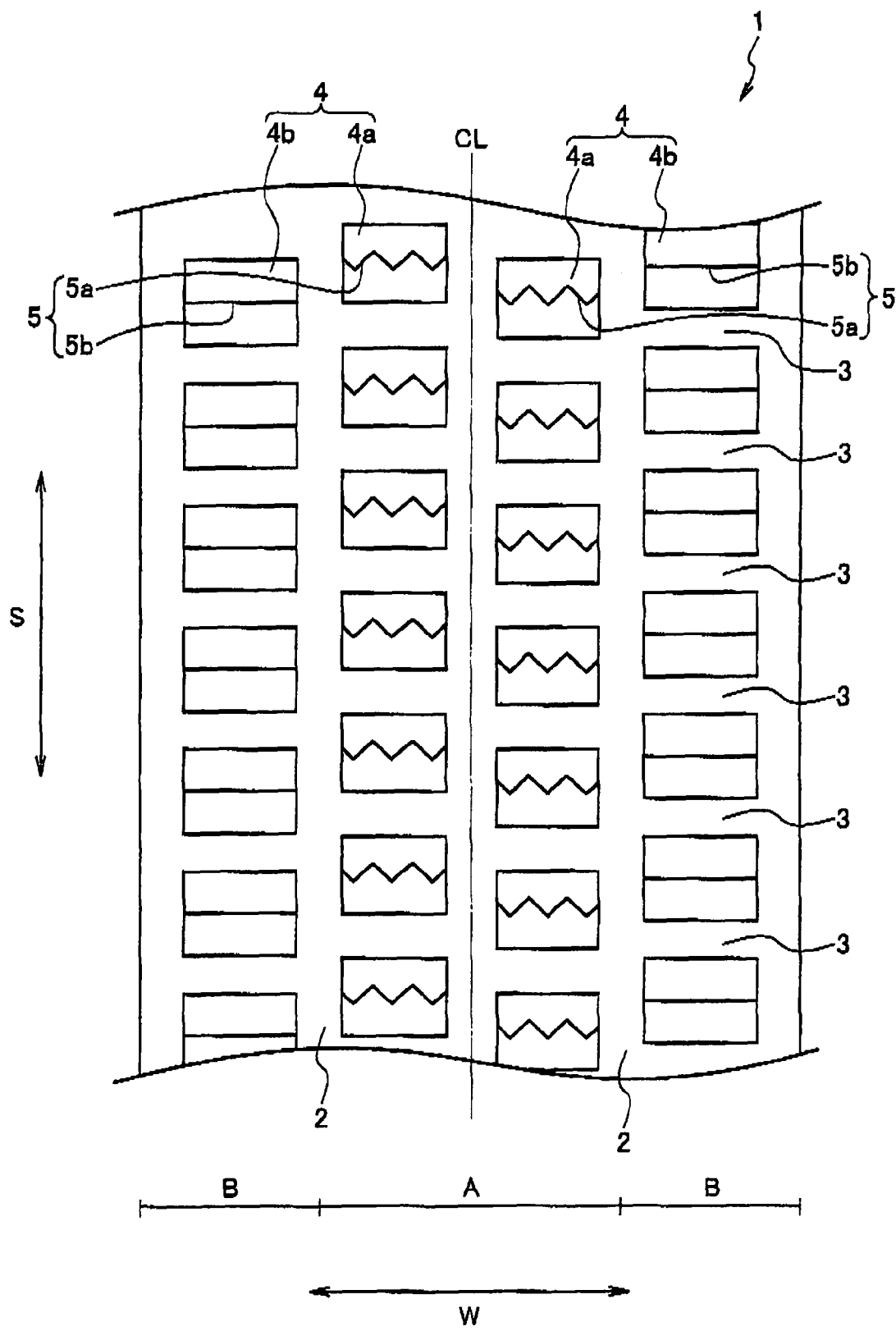
FIG. 1 is a diagram showing a tread portion of a pneumatic tire according to an embodiment of the present invention.

Next, descriptions will be given of an embodiment of the present invention with reference to the drawings. In the following descriptions of the drawings, the same or similar parts are denoted by the same or similar reference numerals and symbols. However, the drawings are schematic, and thus it should be noted that dimensional proportions and the like are different from the real ones. Accordingly, specific sizes and the like should be determined in consideration of the following descriptions. In addition, it goes without saying that some parts are different in dimensional relationship and proportions between the drawings.

(Configuration of Pneumatic Tire)

Hereinafter, descriptions will be given of a sipe 5 formed in a pneumatic tire 1 according to the present embodiment.

FIG. 1 is a diagram showing a tread portion of the pneumatic tire 1 according to the present embodiment.

In the tread portion of the pneumatic tire 1, circumferential-direction grooves 2, width-direction grooves 3 and blocks 4 are formed.

The circumferential-direction grooves 2 are grooves extending in the tire circumferential direction (a direction indicated by an arrow S).

The width-direction grooves 3 are grooves extending in the tire width direction (a direction indicated by an arrow W).

The circumferential-direction groove 2 intersects the width-direction grooves 3 so as to form the blocks 4. The blocks 4 are provided with a sipe 5. In addition, the blocks 4 include center-region blocks 4a and edge-region blocks 4b.

The center-region blocks 4a are blocks formed in a center region A of the tread portion.

The edge-region blocks 4b are blocks formed in edge regions B of the tread portion.

The groove-width of the sipes 5 formed in the center-region blocks 4a is greater than that of the sipes 5 formed in the edge-region blocks 4b. In addition, at least, the sipes 5 formed in the center-region blocks 4a are three-dimensional sipes 5a having a zigzag shape extending in the tire width direction W, in the circumferential direction S, and in the tire radial direction. The three-dimensional sipes 5a will be described in detail later. On the other hand, in the figure, the sipes 5 formed in the edge-region blocks 4b are linear sipes 5b, which is linear in the tire width direction. However, the sipes 5 formed in the edge-region blocks 4b are not limited to this, and may be the three-dimensional sipes 5a.

It should be noted that each of the blocks 4 needs only to be a block defined by at least the circumferential-direction grooves 2, and the width-direction grooves 3 may not be formed in the tread portion.

Figure 2:
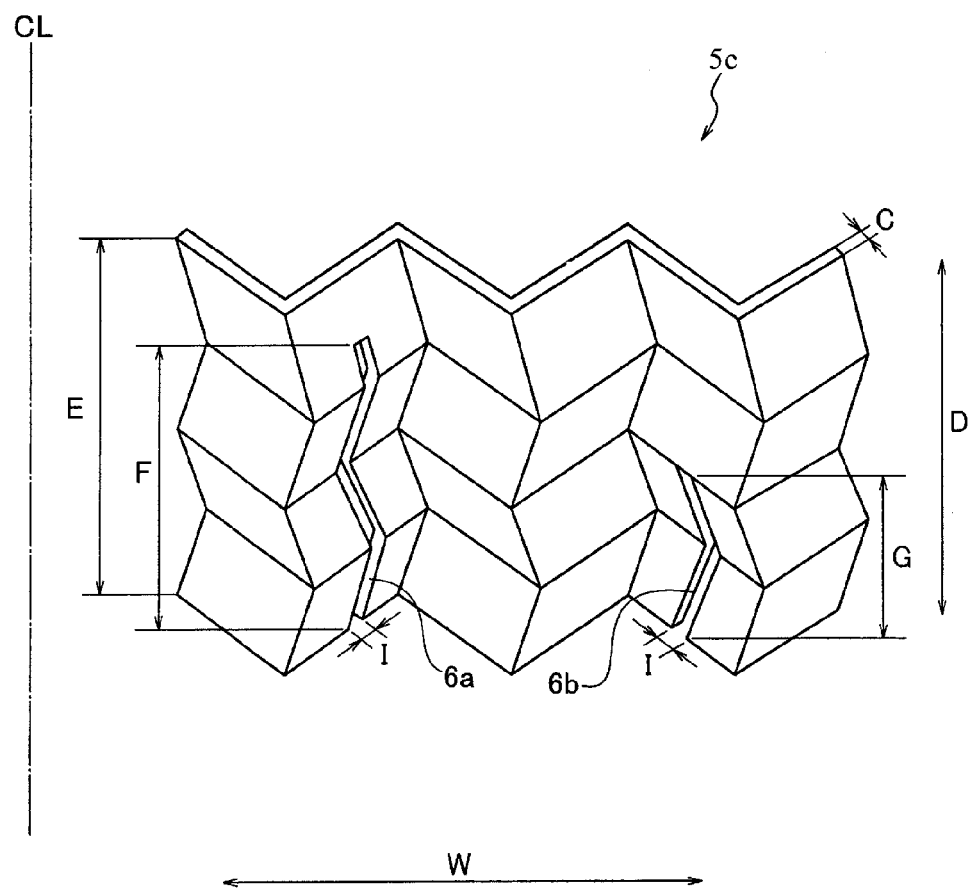
FIG. 2 is an enlarged diagram showing a three-dimensional blade for forming a corresponding sipe according to the embodiment of the present invention.

FIG. 2 is an enlarged diagram showing a blade 5c for forming a corresponding one of the three-dimensional sipes 5a according to the embodiment.

To be exact, each of the three-dimensional sipes 5a is a groove, and thus does not have any shape. Accordingly, the shape shown in the figure is a shape of a blade 5c used for forming the three-dimensional sipe 5a. The three-dimensional sipe 5a having the shape is formed by removing the blade from the block 4.

As shown in the figure, the blade 5c for forming the three-dimensional sipe 5a has a zigzag shape extending in the tire width direction W, in the tire circumferential direction, and in the tire radial direction D. At least one cutout 6, for forming a corresponding tie bar, is formed in the inner side portion, in the tire radial direction D, of each blade for forming the three-dimensional sipe 5a. The cutout 6 has a length in the tire radial direction D (hereinafter, referred to as the depth F or the length depth G of the cutout 6) of 50 to 90% of the length of the blade 5c used to form the three-dimensional sipe 5a in the tire radial direction D (hereinafter, referred to as the depth E of the three-dimensional sipe 5a), and also the cutout 6 has a length in the tire width direction W (hereinafter, referred to as the width I of the cutout 6) of 1 to 5 mm.

Moreover, in a case where two or more of the cutouts 6 are formed in each blade 5c for forming the three-dimensional sipes 5a, it is preferable that the depth F of a center-side cutout 6a, which is closer to the tire equator line, be greater than the depth G of an edge-side cutout 6b as shown in the figure.

(Operation and Effect of Pneumatic Tire According to Present Embodiment)

In the pneumatic tire 1 according to the present embodiment, the groove width of the sipes 5 formed in the blocks 4 constituting the center region A of the tread portion is greater than the groove width of each of the sipes 5 formed in the blocks 4 constituting the edge regions B of the tread portion. Accordingly, the sipes 5 each having the greater groove width can function like grooves. Specifically, at the time of running on snow, the sipes having the greater groove width compress the snow to increase the friction between the tread portion and the road surface, like the grooves. As a result, the starting and braking performances can be improved.

In addition, since the groove width of each of the sipes 5 formed in the blocks 4 constituting the center region A of the tread portion is greater than the groove width of each of the sipes 5 formed in the blocks 4 constituting the edge regions B of the tread portion, the rigidity of the block 4 is decreased. Accordingly, the stability in straight running on the dry road surface is decreased. However, since at least the sipes 5 formed in the blocks 4 constituting the center region A are the three-dimensional sipes 5a each having a zigzag shape extending in the tire width direction W, in the tire circumferential direction S, and in the tire radial direction D, adjacent portions of each of the blocks 4 stick on each other when the block 4 falls down. Accordingly, the rigidity of the block 4 is improved, and thus the stability in straight running on the dry road surface is improved. Moreover, each of the three-dimensional sipes 5a is provided with, on the inner side thereof in the tire radial direction, at least one tie bar corresponding to the dimensions of cutout 6 which has a length, in the tire radial direction, of 50 to 90% of the length of the three-dimensional sipe 5a in the tire radial direction. Further, the cutout 6 has a length, in the tire width direction, of 1 to 5 mm. Accordingly, the depth of part of the three-dimensional sipe 5a can be reduced, and thus the rigidity of the block 4 can be further improved. As a result, it is possible to improve the stability in straight running on the dry road surface. Incidentally, when the length of each tie bar in the tire radial direction is smaller than 50% of the length of each three-dimensional sipe in the tire radial direction, the depth of part of the three-dimensional sipe is not sufficiently reduced. Accordingly, the rigidity of the block cannot be sufficiently improved. On the other hand, when the length of each tie bar in the tire radial direction is greater than 90% of the length of each three-dimensional sipe in the tire radial direction, it is not possible to fulfill the function of the three-dimensional sipe. Accordingly, the starting and braking performances on snow cannot be improved. Furthermore, when the length of each of the three-dimensional sipes in the tire width direction is less than 1 mm, a sufficient rigidity of the block cannot be obtained. Accordingly, the degree of improvement in the stability in straight running on the dry road surface is small. On the other hand, when the length is greater than 5 mm, the rigidity of the block is excessively high. Accordingly, the starting and braking performances on snow cannot be improved.

In addition, in the case where two or more of the tie bars corresponding to cutouts 6 are formed, since one of the tie bars, which is closer to the tire equator line, has a length in the tire radial direction greater than that of the other one of the tie bars, the rigidity of the block on the tire equator line side can be further improved. As a result, it is possible to suppress the reduction in the stability in straight running on the dry road surface.

EMBODIMENTS

Hereinafter, descriptions will be given in detail of an example of the pneumatic tire according to the present invention.

A pneumatic tire including a tread portion of the present invention (Example 1) was prepared. The pneumatic tire was corresponding to the blade 5c shown in FIG. 2, a groove width of 2.0 mm and two tie bars formed therein. The depth F of the center-side tie bar corresponding to cutout 6a is 5.5 mm while the depth G of the edge-side tie bar corresponding to cutout 6b is 4.0 mm. The linear sipe 5b formed in the edge-region blocks 4b has a groove width of 0.7 mm.

Comparative Example 1

Figure 3:
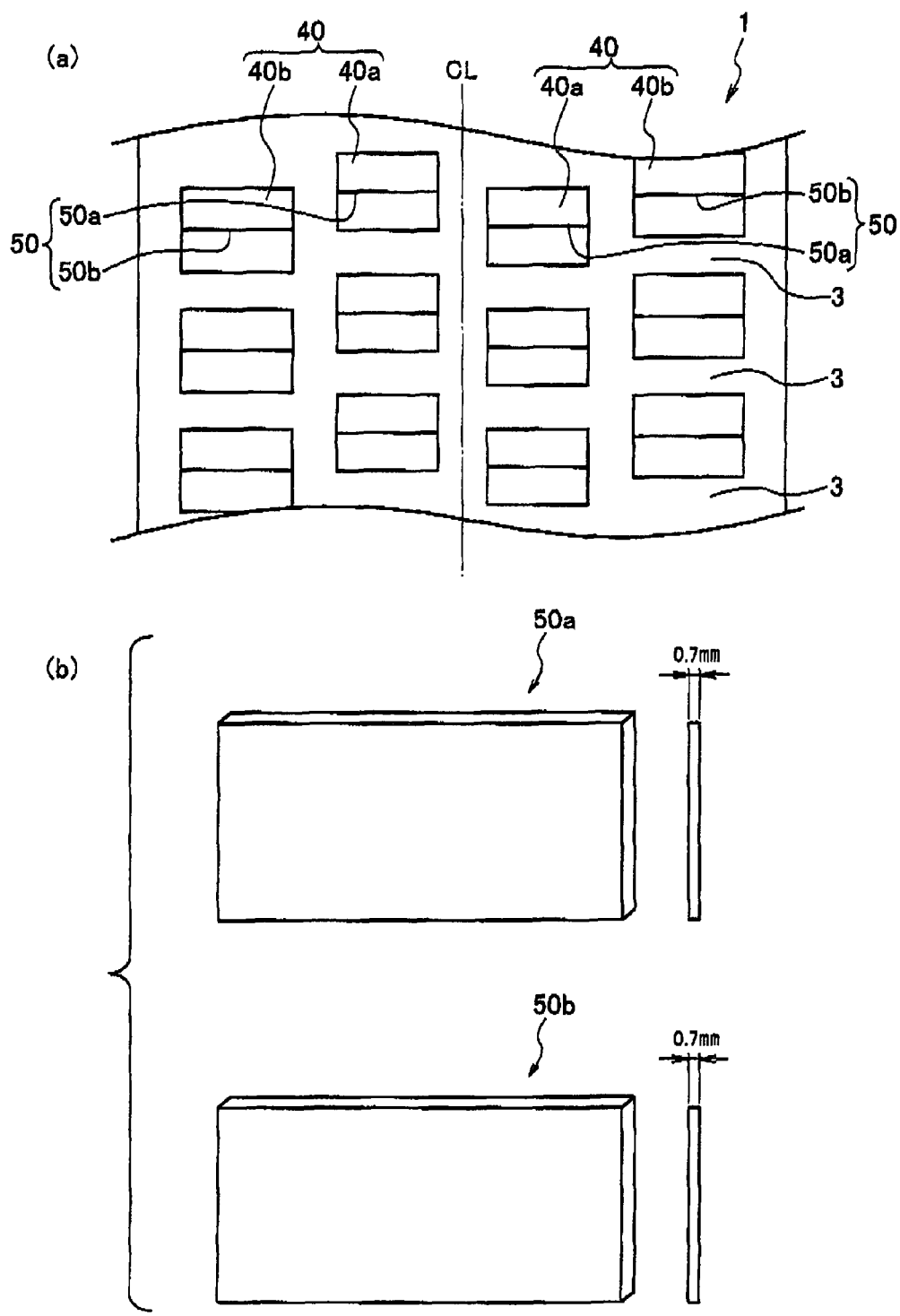
FIG. 3 is a diagram showing a tread portion according to Comparative Example 1 of the present invention.

As shown in FIG. 3(a), each of center-region blocks 40a and edge-region blocks 40b has a linear sipe 50 (50a and 50b). In addition, as shown in FIG. 3(h), the linear sipes 50a each formed in the center-region blocks 40a and the linear sipes 50b each formed in the edge-region blocks 40b have a groove width of 0.7 mm.

Comparative Example 2

As shown in FIG. 4(a), each of the center-region blocks 40a and the edge-region blocks 40b has the linear sipe 50 (50a and 50b). In addition, as shown in FIG. 4(b), the groove width of the linear sipe 50a formed in the center-region blocks 40a is 2.0 mm while the groove width of the linear sipe 50b formed in the edge-region blocks 40b is 0.7 mm.

Comparative Example 3

As shown in FIG. 5(a), each of the center-region blocks 40a has the three-dimensional sipe 50a while each of the edge-region blocks 40b has the linear sipe 50b. In addition, as shown in FIG. 5(b), the groove width of the three-dimensional sipe 50a is 2.0 mm while the groove width of the linear sipe 50b is 0.7 mm.

TABLE 1

|  | Groove Width of Sipe in Center-region Block (mm) | Groove Width of Sipe in Edge-region Block (mm) | Shape of Sipe in Center-region Block | Depth of Sipe (mm) | Cutout Present or Absent | Depth F (mm) | Depth G (mm) | Width I (mm) |
|---|---|---|---|---|---|---|---|---|
| Comparative Example 1 | 0.7 | 0.7 | Linear | 6.5 | Absent | — | — | — |
| Comparative Example 2 | 2.0 | 0.7 | Linear | 6.5 | Absent | — | — | — |
| Comparative Example 3 | 2.0 | 0.7 | Three-dimensional | 6.5 | Absent | — | — | — |
| Example 1 | 2.0 | 0.7 | Three-dimensional | 6.5 | Present | 5.5 | 4.0 | 2.5 | attached to a wheel, and then the wheel with the pneumatic tire was mounted on a front-engine front-wheel-drive vehicle with an engine displacement of 1800 cc. The vehicle was tested to evaluate the starting performance and the braking performance on snow as well as the stability in straight running on the dry road surface. For comparison, pneumatic tires of Comparative Example 1, Comparative Example 2 and Comparative Example 3 were also prepared, and were then tested under the same condition.

Example 1

Example 1 was the pneumatic tire of the present invention. This pneumatic tire is provided with the three-dimensional sipe 5a in each of the center-region blocks 4a, and is also provided with the linear sipe 5b in each of the edge-region blocks 4b. Each of the three-dimensional sipes 5a formed respectively in the center-region blocks 4a has the shape In addition, the size of the rim was 15×6J, and the size of the tire was 205/60 R15 91T. In addition, the depth of the sipe 50 formed in the blocks 40 was 6.5 mm.

<Starting Performance on Snow>

The wheel was started to measure the time taken to increase the speed from 0 km/h to 25 km/h. Incidentally, the shorter time means more excellent the starting performance on snow.

<Braking Performance on Snow>

The wheel was braked to measure the distance taken to decrease the speed from 25 km/h to 0 km/h. Incidentally, the shorted distance means more excellent braking performance on snow.

<Stability in Straight Running on Dry Road Surface>

The vehicle was driven by a professional test driver, and the stability of the vehicle during straight running was evaluated to be rated from 0 to 10. Incidentally, the higher the rated value means more excellent stability in straight speed on the dry road surface.

The results obtained from the tests are shown in Table 2.

TABLE 2

|  | Starting Performance on Snow (seconds) | Braking Performance on Snow (m) | Stability in Straight Running on Dry Road Surface |
|---|---|---|---|
| Comparative Example 1 | 12.1 | 14.2 | 7.0 |
| Comparative Example 2 | 10.4 | 12.0 | 5.75 |
| Comparative Example 3 | 10.5 | 11.8 | 6.75 |
| Example 1 | 10.3 | 11.7 | 7.25 |

From the results shown in Table 2, it was found that, as compared with Comparative Example 1, Example 1 is significantly improved in the starting performance and the braking performance on snow (hereinafter, the starting and braking performances on snow) while being substantially the same in the stability in straight running on the dry road surface.

Moreover, it was also found that, as compared with Comparative Example 2, Example 1 is significantly improved in the stability in straight running on the dry road surface while being substantially the same in the starting and braking performances on snow.

Furthermore, it was found that, as compared with Comparative Example 3, Example 1 is improved in the stability in straight running on the dry road surface while being substantially the same in the starting and braking performances on snow From these results, it was found that a highly good balance can be achieved between the stability in straight running on the dry road surface and the starting and braking performances on snow with a pneumatic tire, including the three-dimensional sipes 5a and the cutouts formed respectively in the inner side portions, in the tire radial direction, of the three-dimensional sipes 5a.

The invention claimed is:

1. A pneumatic tire including a plurality of grooves (2) extending at least in the circumferential direction in a tread portion of the tire and a plurality of blocks (4) formed by the grooves, the pneumatic tire comprising:
   the groove width of a sipe formed in each of the blocks (4a) constituting a center region of the tread portion is greater than the groove width of a sipe formed in each of the blocks (4b) constituting edge regions of the tread portion,
   at least the sipes formed in the blocks (4a) constituting the center region are three-dimensional sipes (5a) each having a zigzag shape extending in the width, circumferential and radial directions of the tire,
   each of the three-dimensional sipes (5a) is formed using a blade having a cutout such that the sipe is provided with, on the inner side thereof in the tire radial direction, at least one tie bar corresponding to the cutout (6) which has a length, in the tire radial direction, of 50 to 90% of the length of the three-dimensional sipe in the tire radial direction, and which has a length, in the tire width direction, of 1 to 5 mm,
   at least two or more tie bars,
   wherein a tie bar which is closer to the tire equator line than an other tie bar, extends to a height in the tire radial direction greater than the height in the tire radial direction of the other tie bar.

* * * * *